United States Patent [19]

Pfleger et al.

[11] 3,714,331

[45] Jan. 30, 1973

[54] PROCESS FOR THE PRODUCTION OF ALKALI THIOCYANATES

[75] Inventors: Hans Pfleger, New York, N.Y.; Friedrich Bittner, Bad Saden; Paul Meffert, Wolfgang, both of Germany

[73] Assignee: Deutsche Gold-und Silber-Scheideanstalt vormals Roessler, Frankfurt (Main), Germany

[22] Filed: Oct. 6, 1970

[21] Appl. No.: 90,183

[30] Foreign Application Priority Data

Oct. 8, 1969 Germany.....................P 19 50 671.9

[52] U.S. Cl. ...................423/366, 423/551, 423/554
[51] Int. Cl..............................C01c 3/20, C01g 1/10
[58] Field of Search...................................23/75, 117

[56] References Cited

UNITED STATES PATENTS

| | | | |
|---|---|---|---|
| 2,372,119 | 3/1945 | Riethof | 23/75 |
| 1,918,355 | 7/1933 | Conway et al. | 23/117 |
| 2,977,187 | 3/1961 | Serreze, Jr. et al. | 23/75 |

FOREIGN PATENTS OR APPLICATIONS

| | | | |
|---|---|---|---|
| 739,635 | 11/1955 | Great Britain | 23/75 |

*Primary Examiner*—Oscar R. Vertiz
*Assistant Examiner*—Hoke S. Miller
*Attorney*—Cushman, Darby & Cushman

[57] ABSTRACT

Alkali thiocyanates are prepared by reacting alkali cyanides with sulfur in the presence of alkali sulfide in a molar amount of 1:1000 to 1:2000 as a solubilizer for the sulfur. The reaction is carried out above the melting point of sulfur, preferably in an alkali thiocyanate solution. The alkali sulfide is then converted to the sulfate by oxidation with hydrogen peroxide.

10 Claims, No Drawings

PROCESS FOR THE PRODUCTION OF ALKALI THIOCYANATES

The present invention is directed to a process for the production of alkali thiocyanates by reacting an alkali cyanide, with sulfur, preferably in an alkali thiocyanate solution, in a given case carried out in the presence of a wetting agent.

It is known to produce alkali thiocyanates by reaction of alkali cyanides with sulfur in presence of sulfur dissolving sulfides such as ammonium hydrogen sulfide or alkali sulfide, see U.S. Pat. No. 2,372,119. The amount of polysulfide component employed thereby is less than the molar amount of cyanide added and corresponds to a molar ratio of $Na_2S$:NaSCN finished product of 1:140. The reaction temperature is not permitted to go beyond 100° C. in order to avoid the sulfur becoming plastic and clotted. Ground sulfur is employed exclusively, which, is relatively expensive compared to the customary fluid sulfur of commerce, because of the danger of ignition of the ground special safety precautions are required. Also relatively large amounts of sulfur dissolver are necessary. This is a definite disadvantage since the sulfur dissolver must be separated in the recovery of the thiocyanate.

It is also known to react ground sulfur with alkali cyanides in the presence of alkali thiocyanates and wetting agents at temperatures between 100° and 110° C. to form alkali thiocyanates, British Pat. No. 739 635. According to this patent a temperature above 110° should be avoided because otherwise the sulfur will melt and thereby react less quickly. A disadvantage of this process in which likewise the expensive sulfur powder must be added is the long reaction time of about 4 hours. Thereby the formation of byproducts is favored. Thus, for example, aqueous sodium cyanide solution at temperatures above 50° C. become saponified to sodium formate in increasing amounts, according to Kirk-Othmer, Encyclopedia of Chemical Technology, Vol. 6, page 589 (2nd edition). To hold the saponification of the cyanide as small as possible is another reason why the cited British patent indicates that reaction temperatures above 110° C. are unfavorable.

On the contrary it has now been found unexpectedly that there can be obtained alkali thiocyanates in practically quantitative yields at a temperature above the melting point of sulfur 112.8° C. at a reaction time of only about 1–2 hours, if the alkali cyanide and sulfur, preferably in an alkali thiocyanate solution, are reacted in the presence of an alkali sulfide as a solubilizer for the sulfur in a molar proportion of 1:1000 to 1:2000 to the added sulfur.

As alkali cyanides there can be used sodium cyanide and potassium cyanide. As alkali thiocyanate solutions there can be used aqueous solutions of sodium thiocyanate and potassium thiocyanate. As alkali sulfides there can be used sodium sulfide and potassium sulfide.

The alkali cyanide and sulfur are normally reacted in approximately equimolar amounts, although sulfur can be used up to an excess of 0.01 mol % of either reactant.

The alkali thiocyanate solution, if employed, can contain 100 to 250 grams of alkali thiocyanate per 100 ml. of water.

The amount of alkali thiocyanate solution is not critical.

Small amounts of wetting agents can be used, e.g. 0 to 0.4 percent of the weight of the alkali cyanide. Thus there can be used any of the wetting agents set forth in British Pat. No. 739635. The wetting agents are preferably alkali stable. Thus there can be used anionic and nonionic wetting agents including alkyl sulfonate salts, e. g. sodium decane sulfonate, sodium octadecane sulfonate, alkylaryl sulfonate salts, e. g. sodium alkylbenzene sulfonates having 14–18 carbon atoms in the alkyl group, sodium propyl naphthalene sulfonates, sodium dodecylbenzene sulfonate, sodium dibutyl naphthalene sulfonates, alkyl sulfate salts, e. g. sodium lauryl sulfate, alkylaryl polyether alcohols, e. g. p-isooctylphenol condensed with 10 ethylene oxide units (and other alkyphenol-ethylene oxide condesation products), fatty acid esters of polyhydric alcohols and the alkylene oxide addition products of such esters, e. g. polyethylene glycol stearate, sorbitan monolaurate, sorbitan monostearate, tris(polyoxyethylene) sorbitan monostearate (tween 60), sorbitan monooleate, polyethylene glycol ester of tall oil acids, soaps, e. g. sodium stearate, potassium stearate, potassium oleate, esters of sodium sulfosuccinic acid, e. g. sodium dihexyl sulfosuccinate, sodium di(2-ethylhexyl) sulfosuccinate, sodium salt of sulfonated monoglyceride of coconut fatty acids, sorbitan sesquioleate, polyethylene glycol lauryl ether, polyethylene glycol ester of rosin acids, tertiary dodecyl polyethylene glycol thioether N onionic 218), etc.

The reaction temperature can be as high as 160° C.

For example, premixed alkali thiocyanate solution, alkali sulfide and wetting agent are heated e.g. to 120° C and then in the course of 1–2 hours the reactants, alkali cyanide and sulfur added in stoichiometric amounts. Advantageously a small excess of sulfur is used.

The small amounts of alkali sulfide remaining after the end of the reaction can be oxidized to the sulfate with hydrogen peroxide of 1 to 35 weight percent at temperatures of 20° to 80° C. with good stirring and the sulfate subsequently precipitated with barium carbonate as barium sulfate. The latter is subsequently separated by filtration. After concentration of the filtrate and crystallization there is obtained an alkali thiocyanate whose purity satisfies the requirements of commerce.

When wetting agents are employed these are preferably added together with the alkali sulfide.

The process of the invention, contrary to expectations, permits the use of easy to handle and cheap liquid sulfur for the production of alkali thiocyanates in practically quantitative yields at decreased reaction times.

The invention is further illustrated by the following examples:

Example EXAMPLE 1

Production of Sodium Thiocyanate

In a 2 liter flask provided with a stirrer, dropping funnel, reflux condenser and a closable filling tube for metering the sulfur there were placed 100 ml. of an aqueous NaSCN solution containing 68.2 grams of NaSCN. There were added four drops of an alkaline resistant wetting agent, specifically Marlophen (which is a noniogen+), (+ wetting agent of the chemical formula

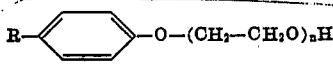

wherein R is alkyl of 6 - 12 C atoms) as well as 1 gram of $Na_2S \cdot 9H_2O$, corresponding to 325 mg. of $Na_2S$ and the mixture heated to 120° C. Finally there were added 392 grams (8 moles) of NaCN in the form of a 40 percent solution in water as well as 258.5 grams of sulfur (8 moles plus 2 grams excess) within an hour while the temperature was held at 120° C. The sulfur thereby should always be present in a slight excess. At the end of the reaction in the solution there was found inclusive of the added sodium thiocyanate 713 grams of NaSCN corresponding to a yield of 99.4 percent.

Finally the sodium sulfide was oxidized with 3 percent hydrogen peroxide at 80° C. with extensive stirring until in testing, a small amount of the solution with lead acetate coloring no longer occurred. For this purpose 100 ml. of 3 weight percent $H_2O_2$ were used.

In comparison experiments with other hydrogen peroxide concentrations and oxidation temperatures the following amounts of $H_2O_2$ solution were needed:

| $H_2O_2$ concentration Weight % | Temperature °C. | amount used ml. |
|---|---|---|
| 3 | 30 | 100 |
| 35 | 30 | 8.5 |
| 35 | 80 | 8.5 |

After addition of 4.5 grams of barium carbonate to the oxidized solution the sulfate was practically completely precipitated by holding the temperature at 80° C. for one hour followed by addition of 0.5 grams of ammonium carbonate. The barium sulfate was separated by filtration.

The solution was then concentrated under water pump pressure to a concentration of about 60 weight percent solids and sodium thiocyanate dihydrate, $NaSCN \cdot 2H_2O$ crystallized out at a temperature below 30° C. After centrifuging there was obtained a product of the following composition.

| | |
|---|---|
| $NaSCN \cdot 2H_2O$ | 98.5% |
| Sulfate | Traces |
| Barium | <<5 ppm |

EXAMPLE 2

Sodium Thiocyanate Production

In the same flask as in example 1, there were added 100 ml. of a NaSCN solution which contained 62.3 grams of NaSCN as well as 1.5 grams of $Na_2S \cdot 9H_2O$, corresponding to 487 mg. of $Na_2S$. The solution was heated to 120° C. Finally there were added 392 grams of NaCN (8 moles) in the form of a 40 percent solution in water as well as 258.5 grams of sulfur (8 moles plus 2 grams excess) within 2 hours while the temperature was held at 120° C. The sulfur thereby should always be present in excess. After the end of the reaction there was found in the solution inclusive of the sodium thiocyanate added 708 grams of NaSCN, corresponding to a yield of 99.5 percent.

EXAMPLE 3

Production of Potassium Thiocyanate

In the reaction vessel described in connection with example 1, there were present 90 grams of KSCN in 100 ml. of water. This was treated with four drops of wetting agent, specifically Marlophen, and 325 mg. of $Na_2S$, heated to 120° C. and within one hour there were added 521 grams of KCN (8 moles) in 750 ml. of water as well as 258.5 grams of sulfur (8 moles plus 2 grams excess) at 120° C. There was obtained a solution which contained 865 grams of potassium cyanide inclusive of the added KSCN, corresponding to a yield of 99.7 percent based on the added cyanide.

In the process of the invention the alkali metal cyanide is generally added as an aqueous solution containing 50 to 80 grams of alkali metal cyanide per 100 ml. of water. Solid alkali metal cyanide can be employed but in such case there must be added a corresponding amount of water.

What is claimed is:

1. A process for the production of alkali thiocyanates comprising reacting in aqueous solution for 1-2 hours an alkali cyanide with sulfur at a temperature above the melting point of sulfur in the presence of alkali sulfide as a sulfur solubilizer in a molar amount of 1:1000 to 1:2000 based on the sulfur.

2. A process according to claim 1 wherein the reaction is carried out in the presence of up to 0.4 percent of a wetting agent.

3. A process according to claim 1 wherein the reaction is carried out in the presence of aqueous alkali thiocyanate solution.

4. A process according to claim 3 including a small amount up to 0.4 percent of an alkali stable wetting agent.

5. A process according to claim 1 including the step of converting the alkali sulfide to alkali sulfate after the reaction by treating the solution with aqueous hydrogen peroxide having a concentration of 1 percent to 35 percent at a temperature of 20° to 80° C.

6. A process according to claim 5 wherein the alkali sulfate formed is precipitated as barium sulfate by the addition of barium carbonate and the precipitate is removed by filtration.

7. A process according to claim 1 wherein there is added up to 0.4 percent of an alkali resistant wetting agent together with the alkali sulfide.

8. A process according to claim 1 carried out at a temperature above 112.8°C. to as high as 160°C.

9. A process according to claim 1 wherein the reaction is carried out in the presence of aqueous sodium or potassium thiocyanate, the alkali cyanide is sodium or potassium cyanide and the reaction is carried out at a temperature above 112.8°C. to as high as 160°C.

10. A process according to claim 9 wherein the alkali cyanide and sulfur are reacted in substantially equimolar amounts.

* * * * *